United States Patent [19]

Smith

[11] Patent Number: 4,862,283
[45] Date of Patent: Aug. 29, 1989

[54] IMAGE DISCRIMINATION WITH CONTINUOUS TONE AREA THINNING

[75] Inventor: Craig M. Smith, Rochester, N.Y.

[73] Assignee: Eastman Kodak Company, Rochester, N.Y.

[21] Appl. No.: 115,321

[22] Filed: Nov. 2, 1987

[51] Int. Cl.$^4$ .............................................. H04N 1/40
[52] U.S. Cl. .................................. 358/443; 358/464; 358/447
[58] Field of Search ................ 358/282, 283, 284, 280

[56] References Cited

U.S. PATENT DOCUMENTS

| | | | |
|---|---|---|---|
| 4,194,221 | 3/1980 | Stoffel | 358/283 |
| 4,251,837 | 2/1981 | Janeway | 358/284 |
| 4,403,257 | 9/1983 | Hsieh | 358/280 |
| 4,447,830 | 5/1984 | Stoffel | 358/283 |
| 4,547,811 | 10/1985 | Ochi | 358/282 |
| 4,554,593 | 11/1985 | Fox et al. | |
| 4,577,235 | 3/1986 | Kannapell et al. | 358/280 |
| 4,630,125 | 12/1986 | Roetling | 358/280 |
| 4,668,995 | 5/1987 | Chem et al. | 358/282 |
| 4,686,579 | 8/1987 | Sakamoto | 358/283 |
| 4,709,274 | 11/1987 | Tanioka | 358/284 |
| 4,729,035 | 3/1988 | Tanioka | 358/282 |

OTHER PUBLICATIONS

EP-A2-0055834 (IBM) 14 Jul. 1982.

GB-A 2172169 (Dainippon Screen Mfg. Ltd.) 10 Sep., 1986.
Patent Abstracts of Japan, vol. 10, No. 325, (E-451), Abstract of JP 61-131683, publ 1986-06-19, Canon Inc.
Patent Abstracts of Japan, vol. 10, No. 251, E432, Abstract of JP 61-80968, publ 1986-04-24, Fuji Xerox Co. Ltd.
Patent Abstracts of Japan, vol. 10, No. 251, E432, Abstract of JP 61-80961 publ 1986-04-24, Fuji Xerox Co. Ltd.

Primary Examiner—James J. Groody
Assistant Examiner—Jerome Grant, II
Attorney, Agent, or Firm—Milton S. Sales

[57] ABSTRACT

Apparatus and method for discriminating between regions of text and continuous tone areas of mixed format documents and for selecting print/no-print decisions to be made by either an image processing algorithm optimized for text or an image processing algorithm optimized for continuous tone. A video signal of digital values indicative of pixels representing the image content of the document is applied to a two-level comparator to produce a preliminary text mode or continuous tone mode decision. A continuous tone preliminary decision is changed to a text decision if the pixel of interest is within a predetermined distance of a text pixel.

8 Claims, 3 Drawing Sheets

IMAGE DISCRIMINATION WITH CONTINUOUS TONE AREA THINNING

BACKGROUND OF THE INVENTION

1. Field of the Invention

This invention relates generally to processing image data obtained by scanning a document; and more particularly to discriminating between text material and continuous tone material in mixed format documents so that the image data may be appropriately processed.

2. Description of the Prior Art

Image processing for electronic copying or facsimile transmission is well know in the prior art. An original document is scanned to produce a video signal representative of the image. The video signal is next processed to optimize the reproduction.

Generally, text and low frequency halftone material (herein collectively referred to as text material) are processed with different algorithms than continuous tone and high frequency halftone material (herein referred to collectively as continuous tone material). Text material is optimized by a processing algorithm which results in sharp edge definition, high contrast, and high frequency detail rendition. Continuous tone material is optimized by an algorithm which results in good gray scale reproduction and only moderate detail rendition. The algorithms which are optimized for one type of material generally yield results which are marginal to poor on the other type of material.

Prior art methods to switch between algorithms optimized for text and those optimized for continuous tone reproduction include methods which discriminate based on the video signal level. The video signal is passed through a two-level comparator network. Signals above an upper threshold or below a lower threshold are processed by the text image processing algorithm, while signals falling between the two thresholds are processed by the continuous tone image processing algorithm.

While this system is generally accurate, small regions in text areas at the edges of objects would be found to be continuous tone regions. If the continuous tone image processing algorithm were used in such small regions, the printed edges would appear ragged. If the object were small, the entire object might be printed as continuous tone if the rise times of the input image are wider than the object. Also, low frequency halftones would have an undesirable appearance because the edges of the halftone dots would be considered to be continuous tone while the centers of the dots would be found to be text.

SUMMARY OF THE INVENTION

In accordance with the present invention, preliminary decisions are made between text and continuous tone processing modes for individual pixels of mixed format documents. Subsequently, continuous tone decisions are changed to text decisions for pixels within a predetermined number of pixels of a text pixel. In effect, this thins (i.e., shrinks) areas of continuous tone by changing the continuous tone decision to a text decision along the borders between areas of text and areas of continuous tone.

In accordance with another feature of the present invention, a video signal representative of the image content is applied to a comparator network which makes a preliminary decision between text and continuous tone processing modes based on the pixels' video signal value, and which generates an output signal representative of the preliminary decision. Continuous tone decisions for pixels within a predetermined number of pixels of a text pixel are changed to text decisions.

The present invention effectively removes the thin continuous tone edges on characters, low frequency halftone material and other objects. It also improves reproduction of narrow-line, low-density characters by thinning completely through the characters, thereby using the text algorithm on the entire character to increase the contrast and quality.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Figure 1:
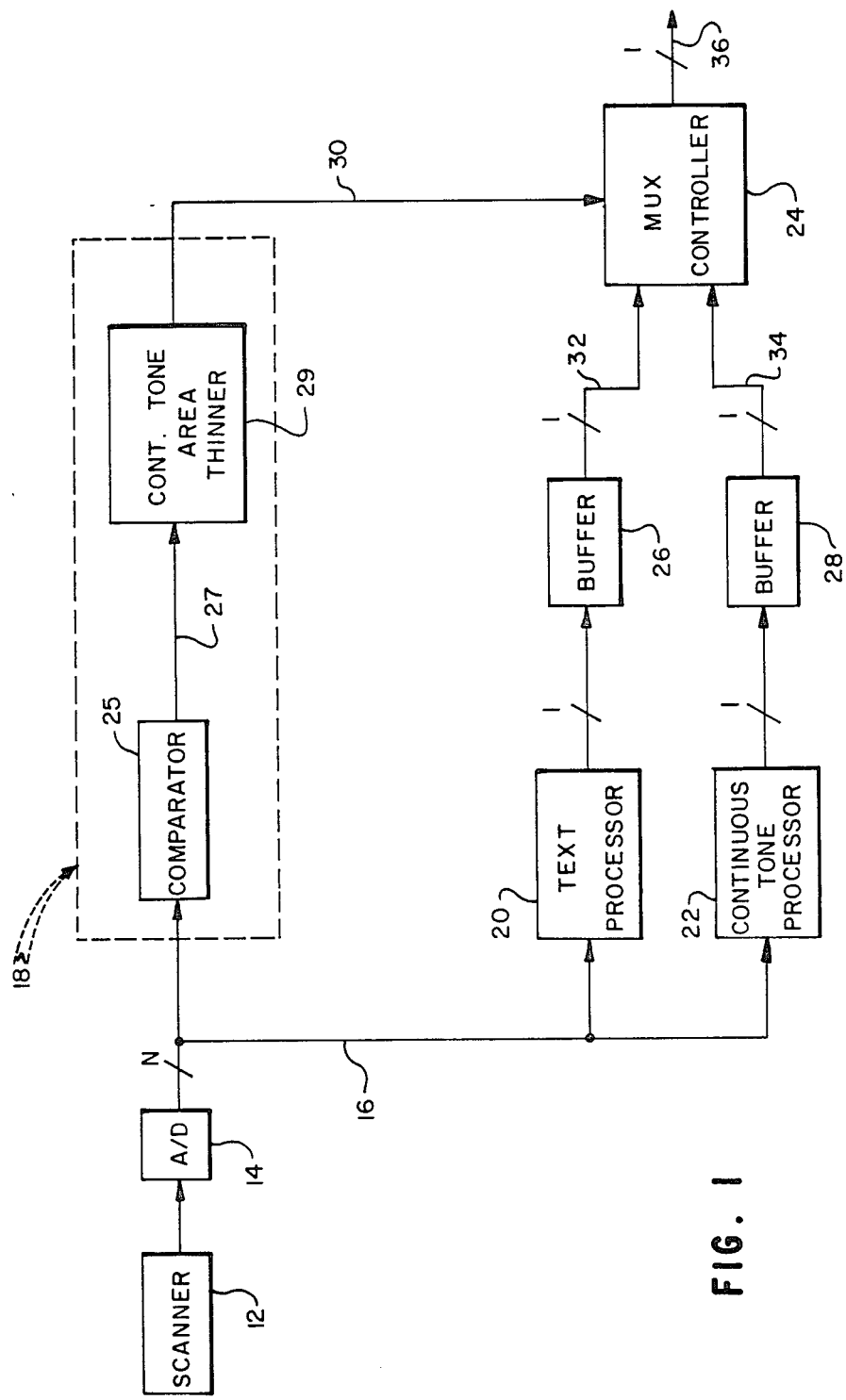
FIG. 1 shows, in block diagram form, image processing apparatus according to a preferred embodiment of the present invention.

Referring to FIG. 1, a document scanner 12 makes successive line scans across a document to generate a video signal of values indicative of pixels. Each individual pixel comprises a discrete voltage representation of the image density of an area of the document, the various voltage levels forming a relative measure of the image gray scale. The voltage representation is digitized at an analog-to-digital converter 14 into N-bit per pixel words. In content, the image on the document may be composed entirely of text, entirely of continuous tone, or combinations thereof.

The output of analog to digital converter 14 is coupled by a bus 16 to a discrimination network 18, a processor 20 having an image processing algorithm optimized for text, and a processor 22 having an image processing algorithm optimized for continuous tone. The outputs of processors 20 and 22 are coupled to a controller 24 through buffers 26 and 28, respectively, which temporarily store processed pixels pending a determination by discrimination network 18 of whether, due to image content, processing by either text processor 20 or continuous tone processor 22 is desirable. The output of controller 24 is coupled to a data recipient.

Text processor 20 comprises any suitable algorithm effective to image process the pixel being examined in a manner optimum for text material. For example, processor 20 may provide a single level threshold against which the pixel being examined is compared. Continuous tone processor 22 comprises an algorithm effective to image process the pixel being examined in a manner optimum for continuous tone material. In either case, the output of the processors are print/no-print decisions for black/white reproduction, respectively.

Discrimination network 18 includes a comparator 25 which compares the video signal level to high and low threshold values. If the video value is outside the comparator threshold values, a preliminary decision to instruct controller 24 to select text processor 20 is created on line 27. If the video value is between the threshold values, the preliminary decision is to use continuous tone processor 22, but that decision can be overridden by a continuous tone area thinner 29, as explained below.

Figures 2, 3:
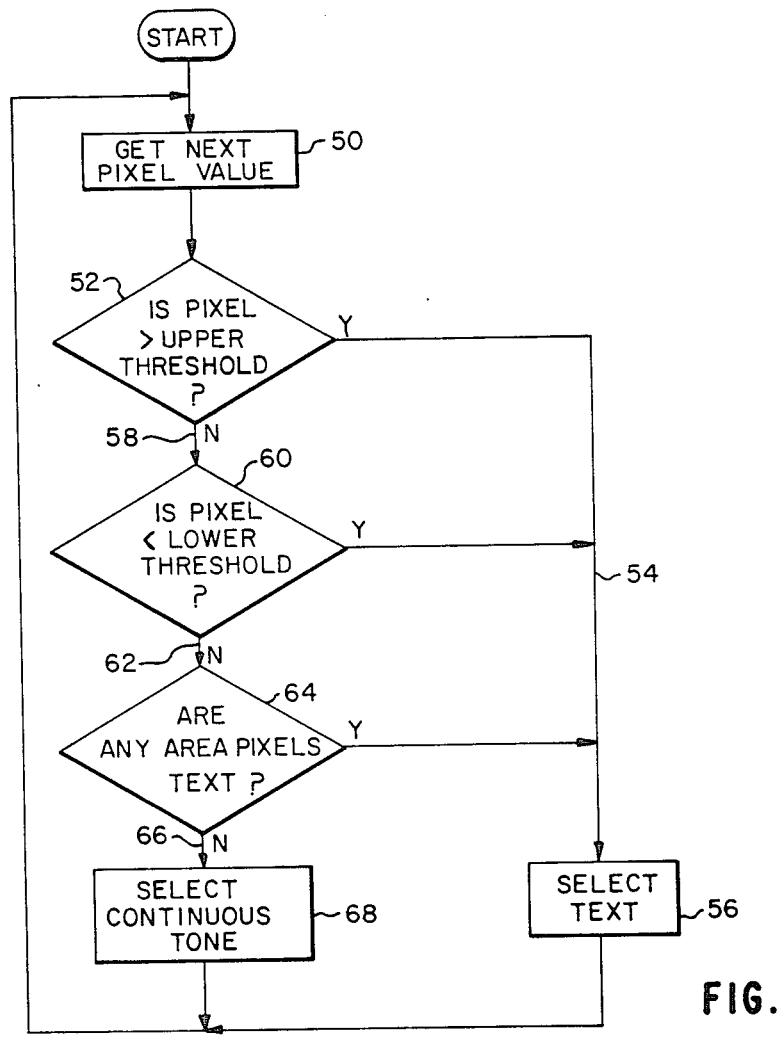
FIG. 2 is a graphical representation of comparator threshold values.
FIG. 3 is a flowchart of the process by which the discrimination of the image is made.

FIG. 2 is a graphic representation of the electrical signals on bus 16 representative of the image being processed. The graph is useful in understanding the conditions used by the invention to make a preliminary decision between text and continuous tone processing modes for individual pixels of the document. FIG. 2 shows video values for a portion of a scanned line. The video values are thresholded at an upper value 40 and a lower value 42 to distinguish text pixels from continuous tone pixels. Signals between the two threshold values 40 and 42 are considered to represent continuous tone pixels.

There are many instances in image processing when a pixel's video value will be between threshold values 40 or 42; even though the pixel comes from, or would best be processed as, a text portion of the image. For example, a pixel which was at the edge of an object in a text area would be partially in white and partially in black, and would have an overall continuous tone density even though it came from a text area of the document. Other instances are set forth in the Background of the Invention section of this specification.

Accordingly, the present invention provides a continuous tone area thinner 29 for shrinking continuous tone areas by changing continuous tone preliminary decisions on line 27 to text decisions whenever there is a text pixel within a predetermined number (say two or three) of pixels of the pixel of interest. This effectively removes the thin gray edges on objects. It also improves narrow-line low density characters by thinning completely through the characters, thereby using the text algorithm on the entire character to increase the contrast and quality of the printed image.

The thinner works by storing several lines of text or continuous tone preliminary decisions from comparator 25. It then examines continuous tone preliminary decisions in a small area around the pixel under consideration. If any of the pixels in the area are found to be text, then the preliminary decision is overridden and the text mode is selected. Only if all the pixels in the small area are found to be continuous tone, is the continuous tone mode selected.

As a result, only borders of continuous tone region are effected. When a continuous tone pixel is on or near the edge of a continuous tone region, the text mode is selected because the area under consideration still contains at least one pixel having a density falling outside threshold levels 40 or 42. This produces a thinner continuous tone region. Very narrow continuous tone regions will be processed completely in the text mode.

FIG. 3 is a flow chart showing process steps to be followed by the system according to the preferred embodiment of the present invention. A conventional microprocessor, a programmable logic array, or discrete logic could be implemented to perform the functions shown in the flowchart.

Referring to FIG. 3, a pixel of interest passes through a connector block 50 and enters into a decisional block 52. In block 52, the pixel is tested to determine whether its video level is greater than upper threshold level 40 of FIG. 2. If so, the logic exits the decisional block along a path 54 into a function block 56 to select text processor 20 for the pixel.

If the decision from decisional block 52 was "no" instead of "yes," then the logic exits block 52 along a path 58 into a decisional block 60. In block 60, the pixel is tested to determine whether its video level is less than lower threshold level 42 of FIG. 2. If so, the logic exits the decisional block to path 54 into function block 56 to select text processor 20 for the pixel.

If the decision from decisional block 60 was "no" instead of "yes" (the video value of the pixel falls between threshold values 40 and 42), then the logic exits block 60 along a path 62 into a decisional block 64. In block 64, the system tests to determine if any pixels within a predetermined distance, or number of pixels, of the pixel of interest have been preliminarily determined to be a text pixel. If such a pixel exists within the predetermined distance or number of pixels, the logic exits the decisional block to path 54 into function block 56 to select text processor 20 for the pixel.

If the decision from decisional block 64 was "no" instead of "yes" (no text pixel exists within the predetermined distance or number of pixels of the pixel of interest), then the logic exits block 64 along a path 66 into function block 68 to select continuous tone processor 22 for the pixel. From function blocks 56 and 68, the program loops to fetch another pixel.

As set forth above, decisional block 68 determines which image processor 20 or 22 is used for a pixel by inspecting pixels in an area surrounding the pixel of interest. The size and shape of the area used to make this determination may be optimized for the expected quality of the input image. If the input image has very sharp edges (i.e. one to two continuous tone pixels being needed to rise from a light area to a dark area), a small area can be used. However, if the rise times of edges are more than three or four pixels, a small thinning area will not be able to completely remove the continuous tone transition region. If this problem occurs, a high pass convolution filter can be used to reduce the rise time of an edge to one or two pixels. A larger area of examination would possibly produce a noticable border around continuous tone areas, but a high pass filter is a more costly solution. For either solution, it is very desirable that the area be at least large enough to completely remove the continuous tone edges of objects in text regions.

Figure 4:
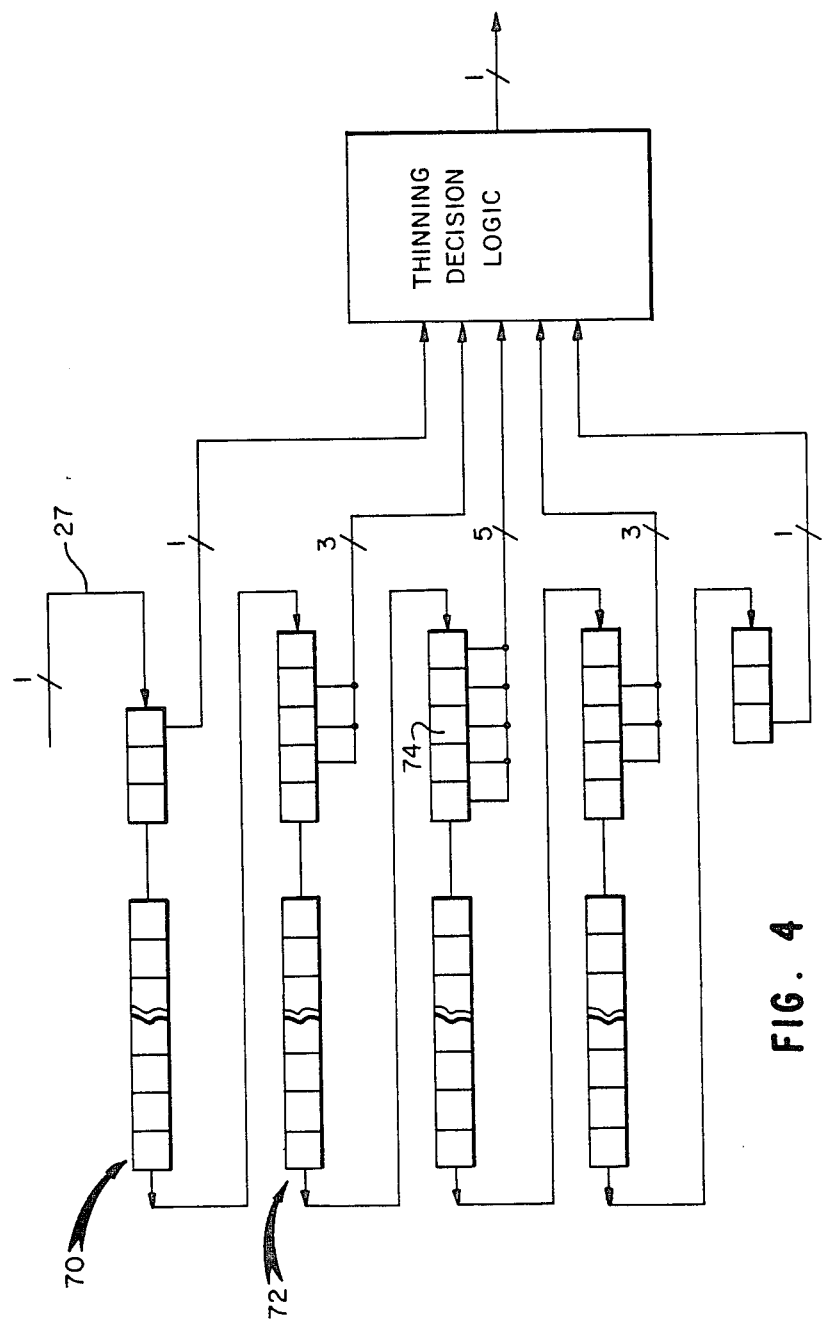
FIG. 4 is representation of the architecture of a preferred embodiment of the continuous tone area thinner which forms a portion of the apparatus of the present invention.

FIG. 4 shows a preferred implementation of the present invention. It is to be noted that both the shape and the size of the area in which pixels are reviewed may change to optimize for different input devices and image content.

As preliminary decisions are made by comparator 25 of FIG. 1, they are passed as single-bit values through an array of memory that is long enough to store the decisions for one line of the scanned image. When the decision for a pixel passes through a first line 70 of storage, it is shifted into a second line 72 of storage. This continues as the decision ripples through the second, third, and fourth lines of storage. Storage location 74 holds the pixel of interest. Since all of the pixel decisions for the entire document are passed through this array, each pixel will be the pixel of interest one time.

A set of thirteen pixel decisions from the array are passed into thinning decision logic 76, described with respect to FIG. 3. These thirteen pixels form a diamond shaped area around the pixel of interest. As described above, the logic examines the preliminary decisions in the area. The final decision for the pixel of interest is continuous tone if all of the preliminary decisions in the area are continuous tone. Otherwise, the decision is text. The result is that any continuous tone pixel that is within two pixels of a text pixel in any direction will be modified to be a text pixel.

The invention has been described in detail with particular reference to preferred embodiments thereof, but it will be understood that variations and modifications can be effected within the spirit and scope of the invention.

What is claimed is:

1. Apparatus for selecting image processing by either text mode or continuous tone mode, said apparatus comprising:

means for differentiating between text and continuous tone pixels, and for generating a preliminary discrimination signal;

means, operable upon the preliminary discrimination signal for a pixel of interest, for creating a final discrimination signal by changing a continuous tone preliminary decision to a text decision if the pixel of interest is within a predetermined distance of a text pixel; and means for selecting (1) text mode image processing when the final discrimination signal is a text decision, and (2) continuous tone image processing when the final discrimination signal is a continuous tone decision.

2. Apparatus as defined in claim 1 wherein the predetermined distance defines an area at least large enough to completely remove continuous tone edges of the objects in text regions.

3. Apparatus as defined in claim 1 wherein the predetermined distance defines a diamond shaped area around the pixel of interest.

4. Apparatus as defined in claim 3 wherein the area encompasses thirteen pixels.

5. Apparatus, operable upon a video signal of values indicative of pixels which represent the image content of a document, for discriminating between text and continuous tone areas of mixed format documents, and for selecting between image processing algorithms optimized for text or image processing algorithms optimized for continuous tone, said apparatus comprising:

first and second image processors having, respectively, a text image processing algorithm and a continuous tone image processing algorithm;

a comparator adapted to differentiate between text and continuous tone pixels depending on the video signal values of the pixels, and to generate a preliminary discrimination signal;

means for applying the video signal to said comparator, and to said first and second image processors;

means, operable upon the preliminary discrimination signal for a pixel of interest, for creating a final discrimination signal by changing a continuous tone preliminary decision to a text decision if the pixel of interest is within a predetermined distance of a text pixel; and means for selecting (1) the first image processor when the final discrimination signal is a text decision, and (2) the second image processor when the final discrimination signal is a continuous tone decision.

6. Apparatus as defined in claim 5 wherein the predetermined distance defines an area at least large enough to completely remove continuous tone edges of objects in text regions.

7. A method for selecting image processing by either text mode or continuous tone mode, said method comprising:

making a preliminary decision if pixels are either text or continuous tone pixels;

making a final decision by changing a continuous tone preliminary decision to a text decision if a pixel of interest is within a predetermined distance of a text pixel; and selecting text mode image processing for pixels having a final text decision, and continuous tone image processing for pixels having a final continuous tone decision.

8. A method, for operating upon a video signal of values indicative of pixels which represent the image content of a document, for discriminating between text and continuous tone areas of mixed format documents and for selecting between processing algorithms optimized for text or image processing algorithms optimized for continuous tone, said method comprising the steps of:

differentiating between text and continuous tone pixels depending on the pixels' video signal values, and generating a preliminary discrimination signal;

creating, for a pixel of interest, a final discrimination signal by changing a continuous tone preliminary decision to a text decision if the pixel of interest is within a predetermined distance of a text pixel; and selecting (1) a text image processing algorithm when the final discrimination signal is a text decision, and (2) a continuous tone image processing algorithm when the final discrimination signal is a continuous tone decision.

* * * * *